Patented July 28, 1942

2,291,326

UNITED STATES PATENT OFFICE 2,291,326

PROCESS OF TOXICITY INDUCTION

Jacquelin E. Harvey, Jr., Atlanta, Ga., assignor of one-half to Southern Wood Preserving Company, East Point, Ga., a corporation of Georgia No Drawing. Application July 13, 1940, Serial No. 345,442

1 Claim. (Cl. 196—53)

The present invention relates to the production of wood preserving oils of enhanced toxic value from tars of aromatic content derived from coal, petroleum, gas or wood.

More specifically, the present invention provides a method for converting said tars, substantially in their entirety, into wood preserving oils of increased toxic value.

As is well known in the art, the provision of wood preserving oils of increased toxic value, that is to say, more toxic than the parent material, can only stem from the protection of the aromatic nuclei from excessive rupture and subsequent degradation by coordination of process variables. Thus, the instant process wherein a wood preservative of increased toxic value is provided may be explained as being produced whilst protecting the aromatic nuclei of the starting material, this in contradistinction to process variable controls that rupture and degrade aromatic nuclei.

It is an object of the present invention to provide toxicity induction under controlled conditions.

Another object of the invention is improving on the process described in Reissue Patent No. 21,438 issued April 30, 1940. The process described in said patent subjected a tar to the controlled action of hydrogen so as to lower coke residue, specific gravity, boiling range and increase toxicity, whereby to provide an oil suitable as a substitute for the conventional creosote-coal tar solution type oils. The newly formed oils as described in the above named patent had a toxicity in excess of the parent material as flowing from the controlled action of hydrogen, which, as stated, must protect aromatic nuclei.

It is an object of the present invention to improve on the process described in the above named patent; said improvement consisting of, among other things, a novel manner in which to enhance toxicity induction.

It has been discovered that the process of the former patent, wherein coal tar, or the like, is converted in one pass through a hydrogenating oven for, among other things, the induction of toxicity, can be improved upon to the end that the induction of toxicity be enhanced.

The present invention provides a specific method for enhancing toxicity induction in tars of aromatic content when processed in accordance with the method described in said former patent.

The toxicity induction of said former patent was based on three major discoveries; first, that toxicity is induced in any of the starting materials mentioned by hydrogenation thereof, and therefore starting materials having toxic properties will have these properties enhanced by the process of the invention; second, that when dealing with the materials named, hydrogenation is preferential upon the high boiling fractions, as a result of which principle together with that stated in the foregoing disclosures, it is possible to change tar, and especially coal tar in its entirety, to a wood preservative having acceptable toxic and other properties; third, that the pitches respond more favorably to hydrogenation if mixed with a solvent therefor, one result being that undue polymerization is reduced or avoided.

The starting materials of the present process, and by the same token, the starting materials of the process described in former said patents, are characterized by the presence of oxygenated compounds. It has been discovered that the induction of toxicity is enhanced by the inclusion of specific provisions that influences the decomposition of said oxygenated compounds.

The following examples will serve to show various modes of practicing the present invention wherein toxicity induction is enhanced by specific provision.

*Example 1.*—A coal tar, as for instance, a coke oven tar, having substantially no ends boiling below 210° C. and having a coke residue of 16%, is subjected to hydrogenation in the presence of a catalyst consisting of molybdenum sulfide and tin chloride, at substantially 400° C. and 200 atmospheres pressure for such a length of time that substantially 5% distills at 200° C. It will be found that the coke residue has been reduced to in the order of 6% or less and that not more than 25% distills at 235° C., and that the benzol solubility and specific gravity will approximate creosote-coal tar solution type oil specifications of the American Preservers Association as noted under Dewey S47, Class 5d, and are as follows:

1. The solution shall be a coal tar product of which at least 80% shall be of coal-gas tar or coke oven tar, and the remainder shall be refined or filtered coal-gas tar or coke oven tar. It shall comply with the following requirements:

2. It shall not contain more than 3% water.

3. It shall not contain more than 2% of matter insoluble in benzol.

4. The specific gravity of the solution at 38° C. compared with water at 15.5° C. shall not be less than 1.05 or more than 1.12.

5. The distillate, on a water-free basis, shall be within the following limits: Up to 210° C., not more than 5%; up to 235° C., not more than 25%.

6. The solution shall yield not more than 6% coke residue.

7. The foregoing tests shall be made in accordance with the standard methods of the American Wood Preservers Association (see Manual-Creosote, analysis).

It is difficult to specify the time required for the reaction. Because of the variation in possible starting materials, the time element can not be spoken of as a definite period, however, with the best catalyst available, it has been found that the time of reaction is at times an hour, more or less.

The coal tar thus treated has toxic properties which pass to a creosote when said creosote is stripped. Due to the fact that hydrogenation is preferential on the higher boiling fractions and due to the fact that hydrogenation, when effected in the presence of a catalyst containing a material selected from the group consisting of halogens, halids, and derivatives thereof, enhances toxicity induction when the controls as noted in the foregoing example are effected, and has the effect of condensing the boiling range of the fractions from the high boiling end toward the low boiling end, and of giving enhanced toxicity to the high boiling ends which had none initially, and to reduce the coke residue sufficiently to bring the entire material within the specifications of an acceptable preservative, the overall material may be used as such perservative.

The term coal tar in this country means high temperature coal tar, as for instance the coke oven tar mentioned in Example 1.

*Example 2.*—A coal tar used in the foregoing example was subjected to identical process conditions, with the exception that the temperature was raised to 410° C. and the pressure raised to 325 atmospheres. The process was continued for one hour and the beneficiated material distilled up to 210° C. to make the product acceptable as a substitute for the creosote-coal tar solution type oils of the American Preservers Association.

By providing the inclusion of a catalytic material selected from the group consisting of halogens, halids, and derivatives thereof, the oxygenated compounds were decomposed while under the influence of hydrogen, thereby assisting or enhancing toxicity induction.

The present process is not confined to the production of a creosote-coal tar solution type oil according to any given specification, but the process is adapted to provide a wood preserving oil of the type recited, of any specification desired.

At times when the increase in volume due to absorption of hydrogen is taken into account, the end product of acceptable wood preserving oil may be found to be substantially volume for volume of the starting material.

*Example 3.*—A tar having a coke residue in excess of 5% derived from coal and distilling predominantly above 190° C. is passed through a high pressure reaction vessel while flowing therethrough 15,000 cubic feet hydrogen per barrel tar, and while contacting a catalyst containing a halogen derivative. Pressure 300 atmospheres, temperature 400° C., time of contact one hour. The beneficiated material is fractionally distilled to an upper limit of 355° C. to recover the portion boiling substantially between 205° C. and 355° C. as a wood preserving distillate acceptable, because of its induced toxic and other properties, as a substitute for grade one creosote. The fraction boiling below said wood preserving range being discarded insofar as the present invention is concerned. The residue resulting from the distillation recovery of said wood preserving oils, being recycled, if desired, with or without the addition of other starting materials to compensate for reduction of volume incidental to the products removed by distillation.

However, when recovering the newly induced wood preserving oil as a distilate, process controls may be so coordinated that when said wood preserving oil is recovered as a distillate, the low ends thereof will fall within the specification limits of a wood preserving distillate.

When practicing the present process to recover the wood preserving product as a distillate, by the proper coordination of process controls and the temperature of stripping, the distillate from the beneficiated material may be made to conform to any of the several specifications of accepted wood preserving distillates noted in the appended tabular data.

WOOD PRESERVING IMPREGNANTS
*Specification*

1. A. W. P. A.
   a. up to 210° C., not more than 5%
   b. up to 235° C., not more than 25%
2. A. W. P. A.
   a. up to 210° C., not more than 1%
   b. up to 235° C., not more than 10%
   c. up to 355° C., not less than 65%
3. A. W. P. A.
   a. up to 235° C., not more than 1½%
   b. up to 300° C., not more than 16½%
   c. up to 355° C., not less than 45%
4. A. W. P. A.
   a. up to 210° C., not more than 8%
   b. up to 235° C., not more than 35%
5. A. W. P. A.
   a. up to 210° C., not more than 10%
   b. up to 235° C., not more than 35%
6. A. W. P. A.
   a. up to 210° C., not more than 5%
   b. up to 235° C., not more than 15%
7. Prussian Ry.
   a. up to 150° C., not more than 3%
   b. up to 200° C., not more than 10%
   c. up to 235° C., not more than 25%
8. N. P. V. & L. A. #220
   a. 5% at 162° C.
   b. 97% at 270° C.
9. S. P. S. S. O.
   a. 5% at 137° C.
   b. 95% at 257° C.
10. N. S. S. O.
    a. I. B. P., 150° C.
    b. 5% at 205° C.
    c. 95% at 292° C.
11. Carbolineums
    a. I. B. P., 270° C.

When recovering the wood preservative of the present invention as a distillate, in the event said distillate at any time includes too great a percentage of low boiling ends, said excess percentage of low boiling ends may be stripped and discarded in so far as the present invention is concerned.

All catalysts effective in the presence of hydrogen for aforesaid purposes are usable in conjunction with other catalytic materials aforenamed. As for instance, chromium, molybdenum, vanadium, uranium, cobalt, copper and their compounds, for instance, sulfides and/or oxides, promoted or not may be used, with or without small amounts of alkali, acid or halid, or derivatives thereof. Small amounts of halogen or halogens, as such, or incorporated with other substance may be used; or effective catalysts deposited on carriers, as for instance, gels, earths, carbon, or the like. Catalysts may be in various shapes, as for instance, forms, extruded shapes or lengths, pellets, comminuted; or mixed with other materials possessing desired action or not; or with or without other material effecting splitting or not; or catalyst with added halogen derivatives.

In the practice of the present invention temperatures in excess of 300° C. are preferred, however, lower temperatures are usable; generally the preferred temperatures are chosen between the limits of 300° C. and 500° C. or higher. Pressures in an excess of 200 atmospheres are preferred, however, lower pressures are usable; generally the preferred pressures are chosen between the limits of 200 and 500 atmospheres, although pressures as high as obtainable are usable.

Minor changes may be made without departing from the spirit of the invention. In the claim affixed to this specification no selection of any particular modification of the invention is intended to the exclusion of other modifications thereof.

I claim:

In the production of wood preserving impregnants of the creosote-coal tar solution type from high temperature coal tar having substantially no ends boiling below 210° C., the process which comprises: subjecting said tar to the action of a flow of hydrogen of about 15,000 cubic feet per barrel material treated whilst contacting as catalytic materials molybdenum sulfide and tin chloride; maintaining a temperature selected between the limits of 300–500° C. whilst coordinating therewith a pressure in excess of 200 atmospheres; carrying on the process for such a length of time as to provide an overall beneficiated material having lowered specific gravity and coke residue and induced toxic properties, said time being so selected as to provide the overall beneficiated tar as an oil of the creosote-coal tar solution type having a specific gravity of between 1.05 and 1.12, a coke residue not in excess of about 6%, and not more than about 25% distilling up to 235° C.

JACQUELIN E. HARVEY, JR.